United States Patent
Dubé et al.

(10) Patent No.: US 8,732,994 B2
(45) Date of Patent: May 27, 2014

(54) DIPPER DOOR RETARDING MECHANISM

(76) Inventors: Yannick Dubé, Fermont (CA);
Alexandre Lévesque, St-Anaclet-de-Lessard (CA)

(*) Notice: Subject to any disclaimer, the term of this patent is extended or adjusted under 35 U.S.C. 154(b) by 480 days.

(21) Appl. No.: 13/074,504

(22) Filed: Mar. 29, 2011

(65) Prior Publication Data

US 2011/0239494 A1   Oct. 6, 2011

(30) Foreign Application Priority Data

Apr. 1, 2010  (CA) .................................... 2698850

(51) Int. Cl.
*E02F 3/40* (2006.01)
*B66C 23/00* (2006.01)

(52) U.S. Cl.
USPC .......................................................... 37/445

(58) Field of Classification Search
USPC ............ 37/444, 445, 442, 398; 414/726, 565, 414/715, 706, 699; 60/469; 188/312, 317, 188/322.11, 307, 322.2; 267/136, 137, 217; 294/119.4, 192
See application file for complete search history.

(56) References Cited

U.S. PATENT DOCUMENTS

| | | | |
|---|---|---|---|
| 2,160,432 A * | 5/1939 | Davidson | ........................ 37/444 |
| 2,434,902 A | 8/1945 | Burdick | |
| 2,735,559 A | 2/1956 | Burdick et al. | |
| 2,840,253 A | 6/1958 | Thompson | |
| 4,006,832 A | 2/1977 | Auxer et al. | |
| 4,282,664 A | 8/1981 | Thiele et al. | |
| 4,443,957 A | 4/1984 | Novotny et al. | |
| 4,517,756 A | 5/1985 | Olds et al. | |
| 5,613,308 A | 3/1997 | Little | |
| 5,735,067 A | 4/1998 | Isley et al. | |
| 5,815,960 A | 10/1998 | Soczka | |
| 5,974,705 A | 11/1999 | Isley et al. | |
| 6,219,946 B1 | 4/2001 | Soczka | |
| 6,467,202 B1 | 10/2002 | Brown, Jr. | |
| 7,096,610 B1 | 8/2006 | Gilmore | |

* cited by examiner

*Primary Examiner* — Robert Pezzuto
(74) *Attorney, Agent, or Firm* — Brouillette & Partners; Francois Cartier; Robert Brouillette

(57) ABSTRACT

A retarding mechanism for continuously retarding the swinging movements of a dipper door comprises a hydraulic braking assembly mounted to the dipper bucket and operatively connected to the dipper door via at least one braking arm pivotally mounted within the braking assembly and at least one linking member pivotally mounted to the dipper door. The retarding mechanism continuously retards the opening and closing movements of the dipper door by controllably braking or slowing the at least one braking arm using the compressive action of at least one hydraulic piston mounted to the braking assembly.

30 Claims, 10 Drawing Sheets

DIPPER DOOR RETARDING MECHANISM

CROSS-REFERENCE TO RELATED APPLICATIONS

The present patent application claims the benefits of priority of commonly assigned Canadian Patent Application No. 2,698,850, entitled "Dipper Door Retarding Mechanism" and filed at the Canadian Intellectual Property Office on Apr. 1, 2010, the content of which is incorporated herein by reference.

FIELD OF THE INVENTION

The present invention generally relates to the technical field of brakes, retarding mechanisms and snubbers for mining shovel dipper doors.

BACKGROUND OF THE INVENTION

Currently, to retard the swinging motion and to mitigate the "banging" problem of dipper doors, dipper manufacturers use door brakes and/or retarding mechanisms also known as "snubbers". These brakes typically comprise a brake assembly installed on the dipper body and connected to the dipper door by a more or less complex linkage assembly.

Examples of dipper door brakes can be found in the following U.S. Pat. Nos. 4,443,957; 4,517,756; 5,613,308; 5,735,067; 5,815,960; 5,974,705; 6,219,946; 6,467,202; 7,096,610.

Typically, failure to have the desired retarding effect on the dipper door will cause an uncontrolled swinging of the dipper door during the opening and closing operation thereof. This uncontrollable swinging will cause repeated impacts between the dipper door and the dipper body, thereby generating excessive noise and subjecting the door to vibrations which will ultimately cause structural damages to the door, to the latching mechanism, and/or to the dipper body.

Though the aforementioned patents propose useful dipper brakes and retarding mechanisms, they generally lack controllability of the braking or retarding. Hence, despite ongoing developments, there is still a need for an improved retarding mechanism for the dipper doors of mining shovel dippers that mitigates at least some of the problems and shortcomings of prior art braking and retarding mechanisms.

SUMMARY OF THE INVENTION

The principles of the present invention are generally embodied in a dipper door retarding mechanism which controllably and continuously retards the swinging movements of the dipper door via the compressive action of at least one hydraulic piston mounted in a substantially caliper-configured assembly.

Hence, a retarding mechanism in accordance with the principles of the present invention generally comprises a braking assembly secured to the dipper body and operatively connected to the dipper door via one or more braking arms and one or more linking members.

The braking arms are pivotally mounted, at one of their ends, in the braking assembly, and at the other of their ends, to the linking member. The linking member is also pivotally connected to the dipper door such that when the dipper door pivots with respect to the dipper body, the braking arms pivot within the braking assembly.

To retard the movement of the braking arms within the braking assembly, and thus, the movement of the dipper door with respect to the dipper body, the braking arms are interleaved between braking plates mounted within the braking assembly. Preferably, but not necessarily, braking disks made from any appropriate composite material (e.g. friction material) may be further interleaved between and/or beside the braking arms and the braking plates. The braking plates and the braking arms are controllably and continuously urged against each other via the compressive action of the at least one hydraulic piston mounted in the braking assembly.

By controlling the hydraulic pressure provided to the at least one piston, the amount of friction generated between the braking arms, the braking plates, and the braking disks, if any, can be easily adjusted, thereby allowing control over the amount of braking. Moreover, adjustment of the hydraulic pressure can be effected directly by an operator. The present invention therefore generally reduces shovel down time due to dipper door damages and also dramatically reduces the time typically required to adjust the retarding mechanism.

Other and further objects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which:

FIG. 8 is another partially exploded perspective view of the retarding mechanism of FIG. 1, without the linking member, the braking plates, the braking disks, the braking arms, and the shaft.

FIG. 9 is a perspective view of the piston assembly of the retarding mechanism of FIG. 1.

DETAILED DESCRIPTION OF THE PREFERRED EMBODIMENT

A novel dipper door retarding mechanism will be described hereinafter. Although the invention is described in terms of specific illustrative embodiments, it is to be understood that the embodiments described herein are by way of example only and that the scope of the invention is not intended to be limited thereby.

The present invention is preferably embodied in a retarding mechanism for continuously retarding the opening and closing, i.e. swinging, movements of the dipper door of the dipper of a mining shovel.

Figure 1:
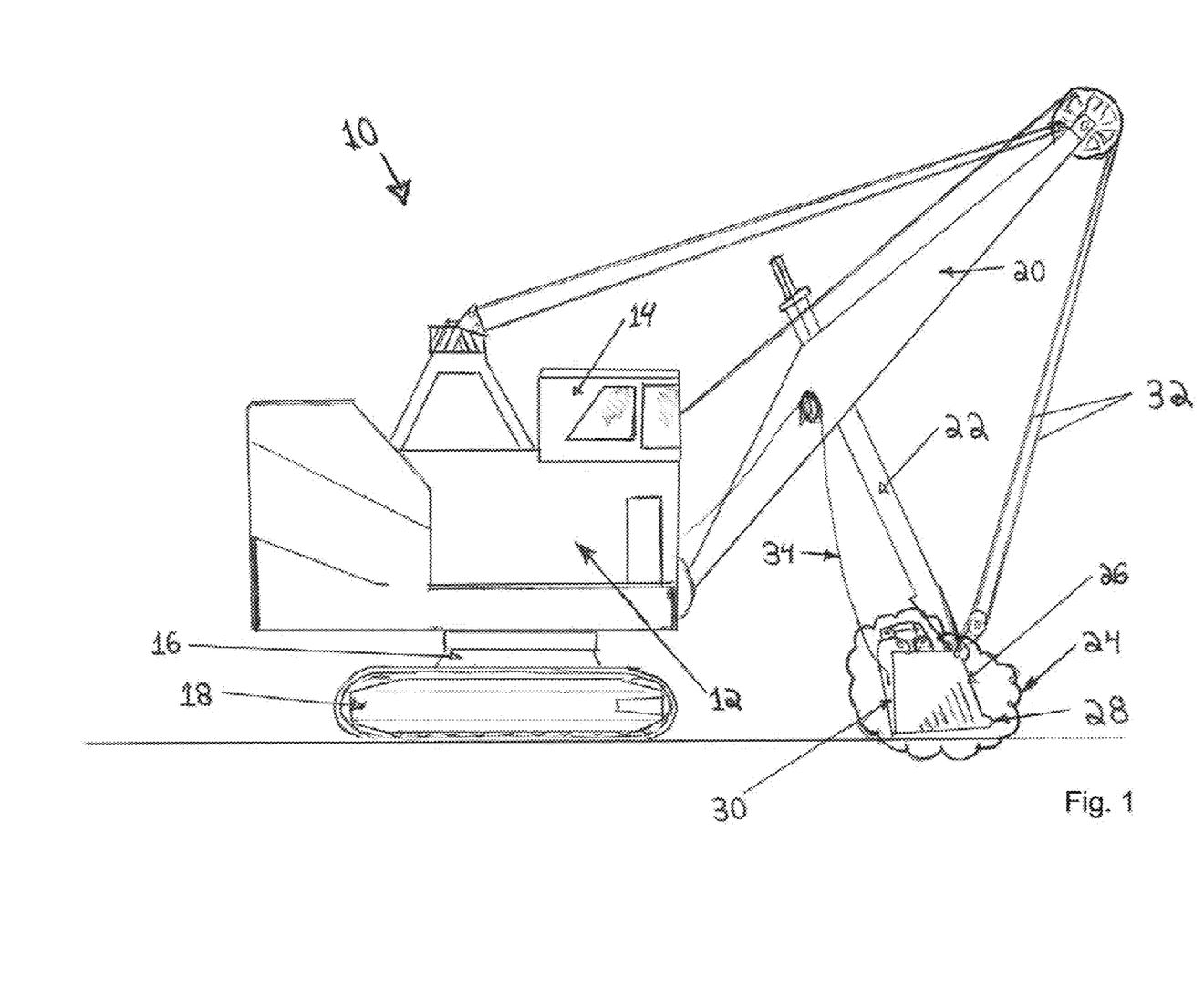
FIG. 1 is a side view of a mining shovel equipped with a retarding mechanism incorporating the principles of the present invention.

Referring first to FIG. 1, an exemplary electric-powered mining shovel 10 is depicted.

The mining shovel 10 has a machinery housing 12 and a control room 14 mounted on a chassis 16 supported by a pair of traction bands 18. Extending from the housing 12 is a boom 20 with an arm 22 pivotally mounted thereto. A dipper 24 is further mounted at the end of the arm 22.

The dipper 24 has a hollow, generally rectangular body 26, forward-facing digging teeth 28 mounted on and extending from the body 26, and a latching door 30 pivotally mounted at the rear of the body 26 for closing the opening in the bottom of dipper body 26.

The movements of the arm 22 and the dipper 24 are typically controlled by cables 32 extending between reels (not shown) mounted within the machinery housing 12 and the dipper body 26. Opening of the dipper door 30 is controlled by a latching cable 34 extending between the machinery housing 12 and the dipper door 30.

Figure 2:
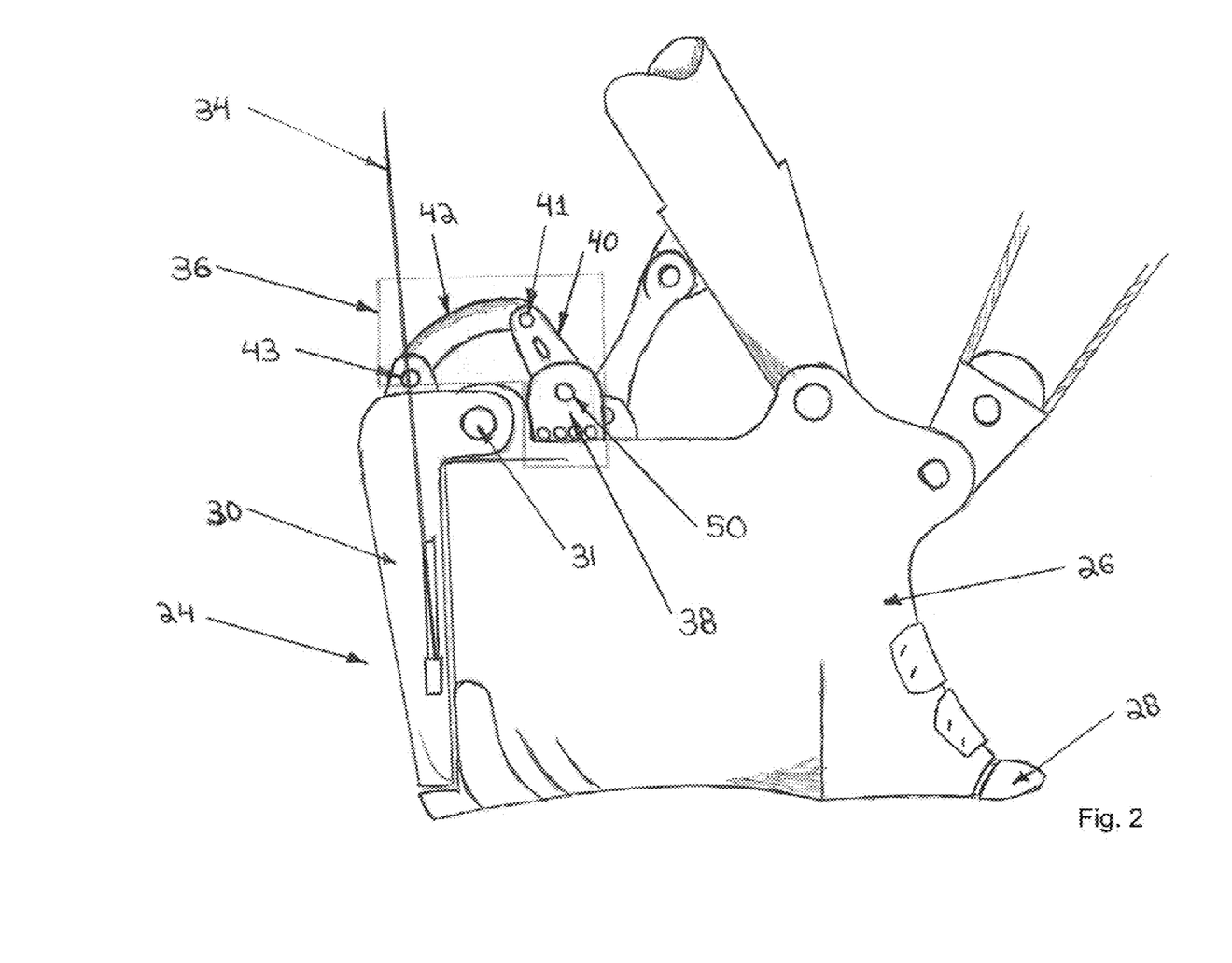
FIG. 2 is an enlarged side view of the dipper assembly of the mining shovel of FIG. 1.

Referring now to FIG. 2, the dipper 24 and the retarding mechanism 36 are illustrated.

The dipper door 30 is typically pivotally mounted to the dipper body 26 via a shaft 31 and is controllably opened by the latching cable 34. For its part, the retarding mechanism 36 generally comprises a braking assembly 38 secured to the dipper body 26, a plurality of braking arms 40 pivotally mounted, at one of their ends, to the braking assembly 38 via a shaft 50, and at the other of their ends, to a linking member 42 via a shaft 41. The linking member 42 is further pivotally connected to the dipper door 30 via another shaft 43 such that, as the dipper door 30 pivots about the shaft 31, the linking member 42 pivots about shafts 43 and 41 and forces the braking arms 40 to pivot about the shaft 50 within the braking assembly 38.

Referring now to FIGS. 2 to 9, the retarding mechanism 36 will now be described in more details.

Broadly, and in accordance with the principles of the present invention, the retarding mechanism 36 generally functions by controllably and continuously retarding the opening and closing, i.e. swinging, movements of the dipper door 30 through the compressive action of at least one hydraulic piston 44 on the braking arms 40 as the latter rotate within the braking assembly 38.

In the present embodiment, the braking assembly 38 preferably comprises a pair of opposite hydraulic pistons 44.

The braking assembly 38 of the retarding mechanism 36 generally comprises a base 46 secured to the dipper body 26, preferably, but not exclusively, by welding.

Figure 7:
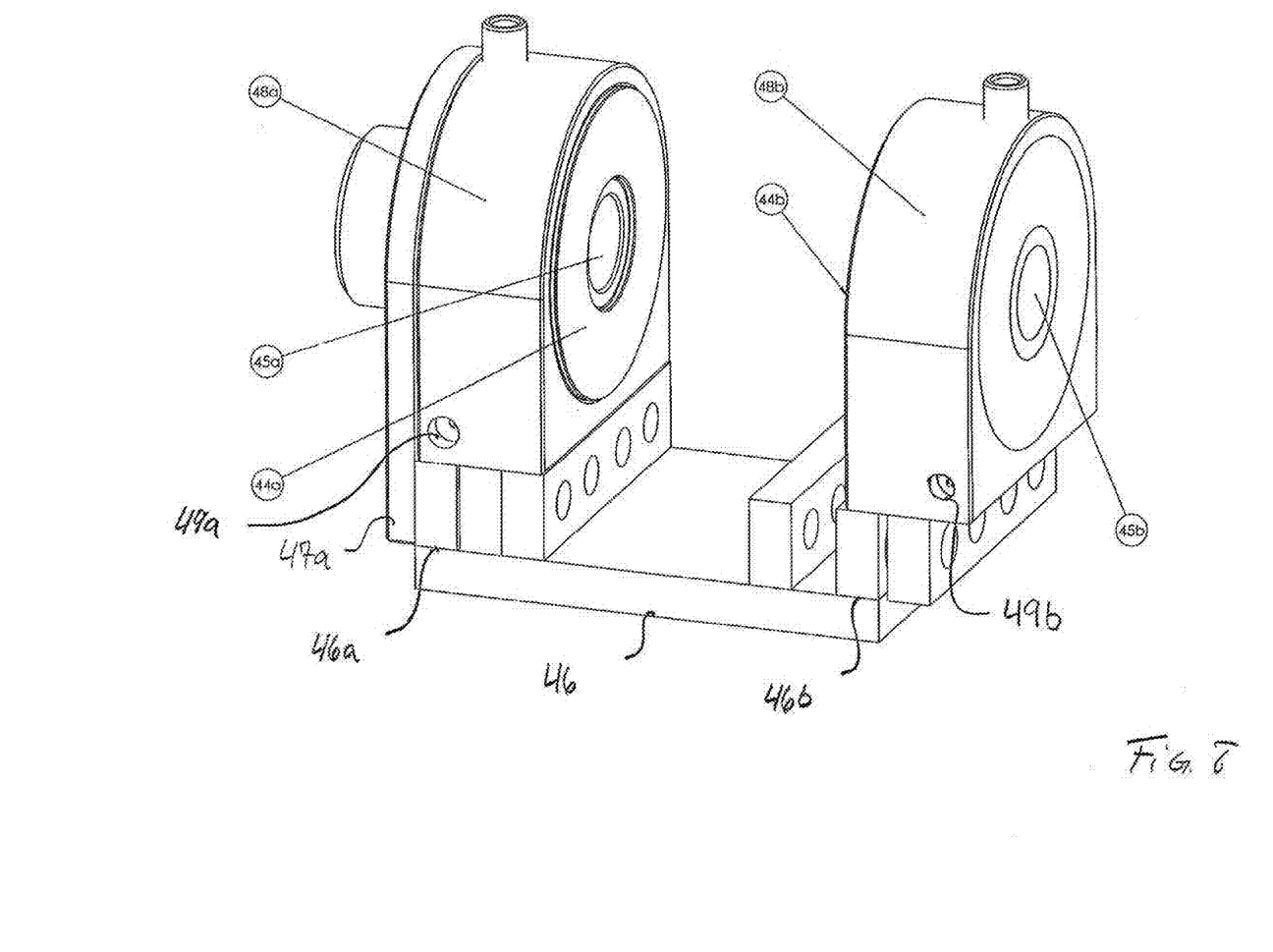
FIG. 7 is a partially exploded perspective view of the retarding mechanism of FIG. 1, without the linking member, the braking plates, the braking disks and the braking arms.

Respectively fixedly mounted to the lateral portions 46a and 46b of the base 46, via bolts 55 (see FIG. 7), are two annular cylinders 48 (48a and 48b) respectively comprising hydraulic ports 49 (49a and 49b) adapted to be connected to a hydraulic fluid source which will be described further below. Each cylinder 48 respectively slidingly receives therein an annular piston 44 (44a and 44b). As best shown in FIGS. 7 and 8, the pistons 44 are mounted such as to face each other. The skilled addressee will also note the caliper-shaped configuration of the base 46 and the cylinders 48 as best illustrated in FIGS. 7 and 8.

Further mounted to the lateral portions 46a and 46b are two retaining plates 47 (47a and 47b). The retaining plates 47 generally extend perpendicularly with respect to the base 46. As the skilled addressee will understand, the retaining plates 47, which are secured to the base 46, prevent the braking assembly 38 from opening under the load of the opposite pistons 44.

Extending between the two retaining plates 47, the two cylinders 48, and through the openings 45 (45a and 45b) in the annular pistons 44, is the cylindrical shaft 50. The shaft 50 is preferably removably secured, through nut 51, to the cylinders 48a and 48b, or, as shown in FIGS. 4 to 8, to the retaining plates 47 (47a and 47b). The shaft 50 acts as the rotation axis about which rotate the braking arms 40 which will be described in more details below. Preferably, the shaft 50 is so mounted to the retaining plates 47 such that it is prevented from rotating with respect to the cylinders 48 and the pistons 44.

Referring now to FIGS. 3 to 6, mounted to the shaft 50 and between the pistons 44 are a plurality of braking plates 52. Each braking plate 52 is provided with an opening 53 through which extends the shaft 50. In the present embodiment, the braking plates 52 are neither fixed to the shaft 50 nor to the base 46 and are therefore free to slide along the shaft 50 during use. However, even though they are not fixed to the shaft 50, the braking plates 52 are not free to rotate thereabout. Indeed, due to their flat bottom portion located adjacent to the flat top surface of the base 46 (see FIGS. 3 to 6), the braking plates 52 are mechanically prevented from rotating about the shaft 50 during use. Still, in variants of the present embodiment, the braking plates 52 could be configured to be allowed to rotate about the shaft 50 (e.g. braking plates of having an annular shape).

Figure 3:
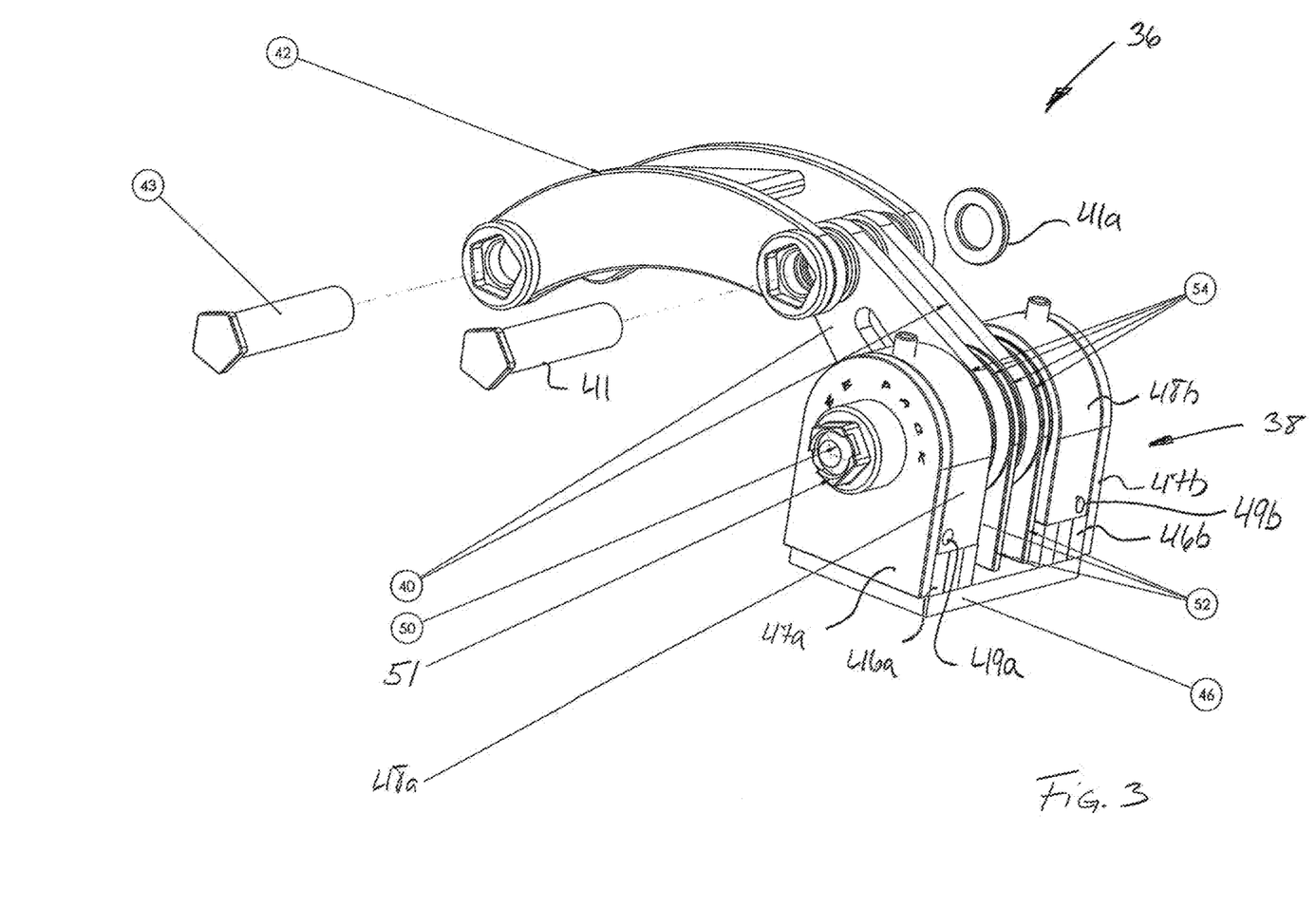
FIG. 3 is a perspective view of the retarding mechanism of FIG. 1.
Figure 4:
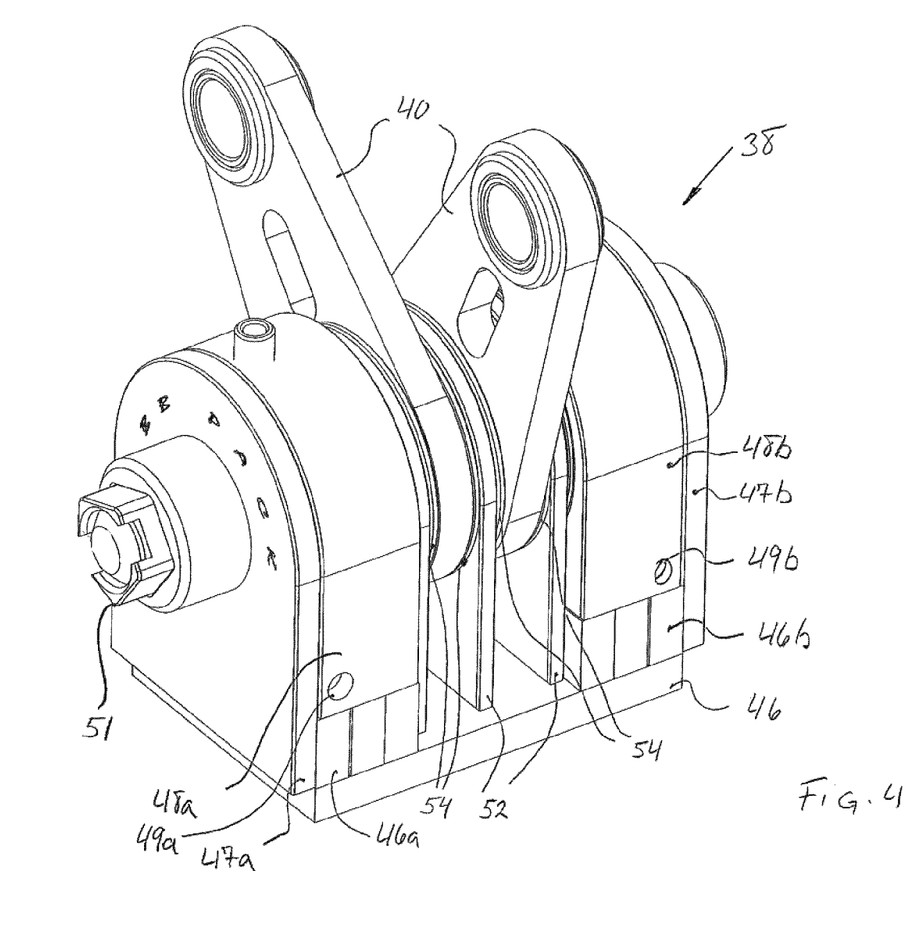
FIG. 4 is a perspective view of the retarding mechanism of FIG. 1, without the linking member.
Figure 5:
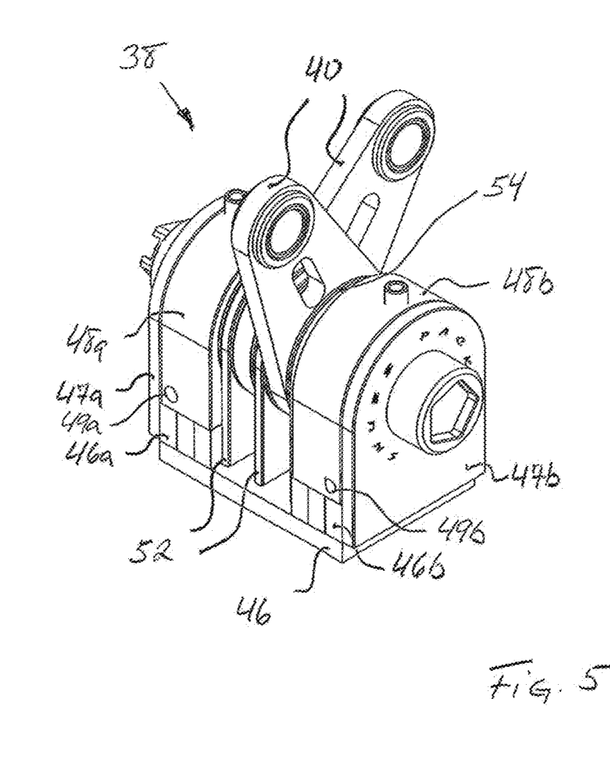
FIG. 5 is another perspective view of the retarding mechanism of FIG. 1, without the linking member.
Figure 6:
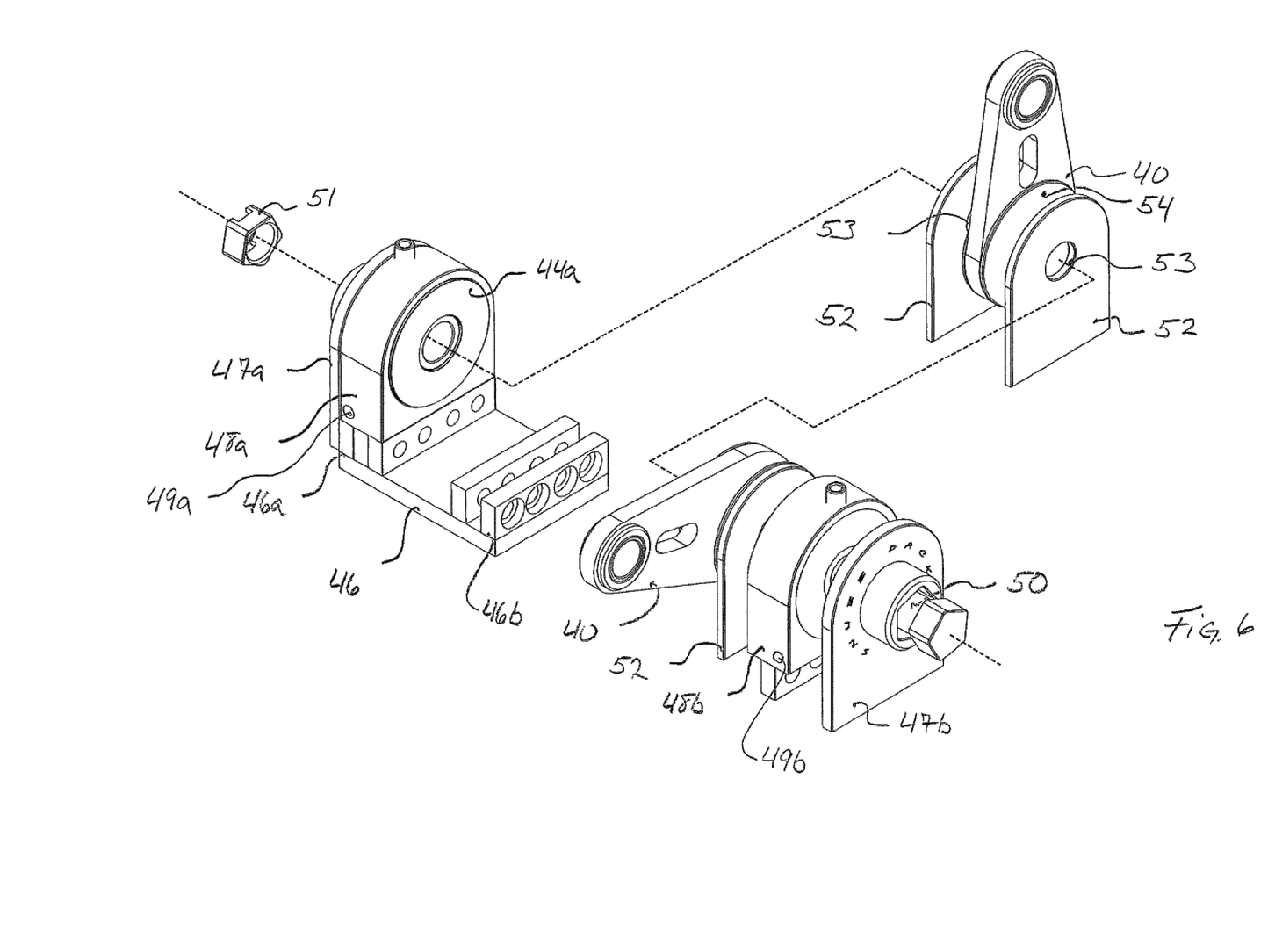
FIG. 6 is a perspective exploded view of the retarding mechanism of FIG. 1, without the linking member.

Further pivotally mounted to the shaft 50 and interleaved between the braking plates 52 are the braking arms 40. As the skilled addressee will understand, the braking arms 40 are also pivotally mounted, at their respective other end, to the linking member 42 as best shown in FIGS. 2 and 3.

Referring back to FIGS. 3 to 6, in the present embodiment, braking disks 54 are further interleaved between the braking plates 52 and the braking arms 40. The braking disks 54 are generally annular in shape and are typically made from friction material such as to create friction between the braking arms 40 and braking plates 52. Still, the braking disks 54 could be made from other materials though with varying friction-generating capacity.

When in use, the pistons 44 continuously compress the braking plates 52, the braking arms 40 and the braking disks 54 against each other such that the opening movements and the closing movements of the dipper door 30 are both continuously retarded. Hence, in accordance with the principles of the present invention, the retarding mechanism 36 will continuously retard the swinging movements of the dipper door 30.

To control the retarding of the movements of the dipper door 30, the friction generated between the braking plates 52, the braking arms 40 and the braking disks 54 can be controlled by adjusting the compressive force of the pistons 44. In the present embodiment, the compressive force of the pistons 44 is adjusted by controlling the amount of hydraulic pressure, or fluid, provided to them.

Figure 10:
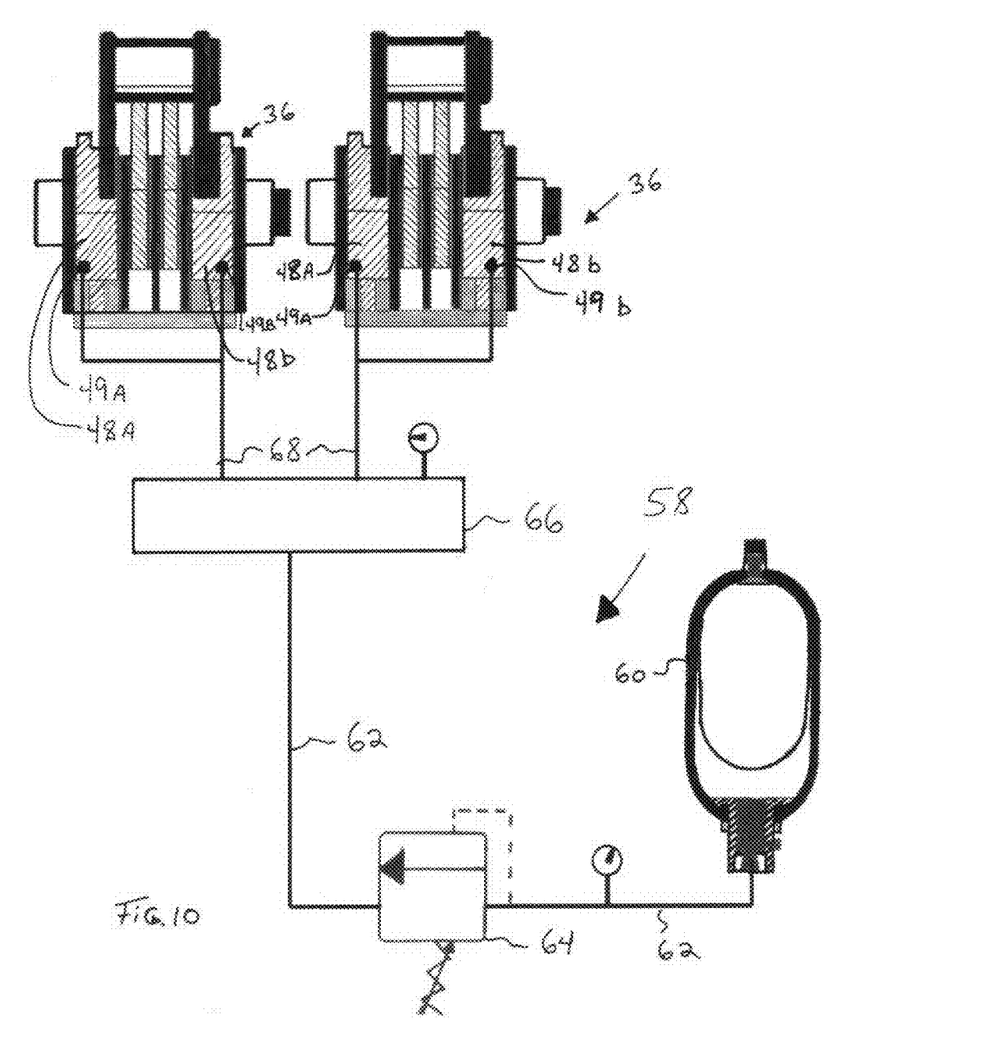
FIG. 10 is a schematic view of the retarding mechanism of FIG. 1 and an exemplary hydraulic pressure source.

Hence, referring now to FIG. 10, in order to provide hydraulic pressure to the pistons 44, the cylinders 48 of each braking assembly 38 are each connected, via their respective hydraulic fluid port 49, to a hydraulic pressure source 58.

In the present embodiment, the hydraulic pressure source 58 generally comprises a pressurized hydraulic fluid reservoir 60, which is fluidly connected to a hydraulic distributor 66 via hydraulic lines 62.

In variants of the present embodiment, instead of the hydraulic fluid reservoir 60, the hydraulic pressure source 58 could comprise a hydraulic power pack.

As best shown in FIG. 10, the hydraulic distributor 66 is further fluidly connected to the hydraulic fluid ports 49 of the cylinders 48 via hydraulic lines 68.

In the present embodiment, the hydraulic fluid reservoir 60 is mounted to the dipper body 26 and is preferably encased in a housing (not shown) made from steel or other similarly resistant material.

At this point, the skilled addressee will understand that when the dipper door 30 moves toward or away from the dipper body 26, the pivotal movement of the braking arms 40 about the shaft 50 will be retarded by the compression of the braking plates 52, of the braking disks 54 and of the braking arms 40 through the compressive action of the pistons 44. Hence, in accordance with the principles of the present invention, the pivotal movement of the dipper door 30 is effectively continuously retarded by the compressive action of the hydraulic pistons 44 on the braking arms 40.

Moreover, the compressive action of the pistons 44 can be controlled through the amount of hydraulic pressure provided thereto by the hydraulic pressure source 58. Thus, by controlling the hydraulic pressure provided to the pistons 44, the pivotal movement of the dipper door 30 can be more or less retarded.

Understandably, control over the hydraulic pressure provided to the pistons 44 could be either manual or automatic.

The present invention therefore represents a clear improvement over prior art retarding mechanisms as the retarding level of the retarding mechanism 36 can be easily controlled and easily adjusted by adjusting the amount of hydraulic pressure, or fluid, provided to the hydraulic pistons 44.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A mechanism for continuously retarding movements of a door of a dipper with respect to a body of the dipper, the mechanism comprising:
   a) a base configured to be secured to the body;
   b) at least one hydraulic piston mounted to the base, the at least one piston being fluidly connected to a hydraulic pressure source;
   c) a shaft mounted to the at least one piston;
   d) at least one braking plate mounted to the shaft;
   e) at least one braking arm having a first end and a second end, the first end of the braking arm being pivotally mounted to the shaft;
   f) at least one linking member having a first end and a second end, the first end of the linking member being pivotally connected to the second end of the at least one braking arm, and the second end of the linking member being configured to be pivotally connected to the door;
   whereby when hydraulic fluid is provided to the at least one piston, the at least one piston presses the at least one braking plate and the first end of the at least one braking arm against each other, effectively retarding a pivotal movement of the at least braking arm and effectively retarding a pivotal movement of the door with respect to the body.

2. A retarding mechanism as claimed in claim 1, further comprising a retaining plate mounted to the base, and wherein the shaft extends between the at least one piston and the retaining plate.

3. A retarding mechanism as claimed in claim 2, wherein the at least one piston comprises an opening therethrough, and wherein the shaft extends through the opening.

4. A retarding mechanism as claimed in claim 3, wherein the at least one braking plate is slidingly mounted to the shaft.

5. A retarding mechanism as claimed in claim 4, further comprising at least one braking disk interleaved between the at least one braking plate and the first end of the at least one braking arm.

6. A retarding mechanism as claimed in claim 5, wherein the at least one braking disk is made from friction-generating material.

7. A retarding mechanism as claimed in claim 3, comprising several braking arms, each of the braking arms having a first end pivotally mounted to the shaft and a second end pivotally connected to the at least one linking member.

8. A retarding mechanism as claimed in claim 7, comprising several braking plates slidingly mounted to the shaft and interleaved between the first ends of the braking arms.

9. A retarding mechanism as claimed in claim 8, further comprising several braking disks interleaved between the braking plates and the first ends of the braking arms.

10. A mechanism for continuously retarding movements of a door of a dipper with respect to a body of the dipper, the mechanism comprising:
    a) a base configured to be secured to the dipper body;
    b) first and second hydraulic pistons mounted to the base such as to face each other, the first and second pistons being fluidly connected to a hydraulic pressure source;
    c) a shaft mounted to the first and second pistons;
    d) braking plates slidingly mounted to the shaft;
    e) at least one braking arm having a first end and a second end, the first end of the at least one braking arm being pivotally mounted to the shaft and being interleaved between two of the braking plates;
    f) at least one linking member having a first end and a second end, the first end of the at least one linking member being pivotally connected to the second end of the at least one braking arm, and the second end of the at least one linking member being configured to be pivotally connected to the dipper door;
    whereby when hydraulic fluid is provided to the first and second pistons, the first and second pistons move toward each other and press the braking plates against the first end of the at least one braking arm, effectively retarding a pivotal movement of the at least one braking arm with respect to the shaft.

11. A retarding mechanism as claimed in claim 10, wherein the first and second pistons each comprises an opening therethrough, and wherein the shaft extends through the central openings.

12. A retarding mechanism as claimed in claim 11, further comprising braking disks interleaved between the braking plates and the first ends of the braking arms.

13. A retarding mechanism as claimed in claim 12, wherein the braking disks are made from friction-generating material.

14. A retarding mechanism as claimed in claim 11, comprising several braking arms, each of the braking arms having a first end pivotally mounted to the shaft and a second end pivotally connected to the at least one linking member.

15. A retarding mechanism as claimed in claim 14, wherein each of the first ends of the braking arms is interleaved between two of the braking plates.

16. A retarding mechanism as claimed in claim 15, further comprising several braking disks interleaved between the braking plates and the first ends of the braking arms.

17. A retarding mechanism as claimed in claim 16, wherein the braking disks are made from friction-generating material.

18. A retarding mechanism as claimed in claim 11, further comprising first and second retaining plates mounted to the base, wherein the first retaining plate is located adjacent to the first piston and the second retaining plate is located adjacent to the second piston.

19. A retarding mechanism as claimed in claim 18, wherein the shaft is secured to the first and second retaining plates.

20. A dipper comprising a body, a door pivotally mounted to the body, and a mechanism for retarding a pivotal movement of the door with respect to the body, the mechanism comprising:
 a) a base secured to the body;
 b) first and second hydraulic pistons mounted to the base such as to face each other, the first and second pistons being fluidly connected to a hydraulic pressure source;
 c) a shaft mounted to the first and second pistons;
 d) braking plates slidingly mounted to the shaft;
 e) at least one braking arm having a first end and a second end, the first end of the at least one braking arm being pivotally mounted to the shaft and being interleaved between two of the braking plates;
 f) at least one linking member having a first end and a second end, the first end of the at least one linking member being pivotally connected to the second end of the at least one braking arm, and the second end of the at least one linking member being pivotally connected to the door;
 whereby when hydraulic fluid is provided to the first and second pistons, the first and second pistons move toward each other and press the braking plates against the first end of the at least one braking arm, effectively retarding a pivotal movement of the at least one braking arm with respect to the shaft as the door pivots with respect to the body.

21. A dipper as claimed in claim 20, wherein the first and second pistons each comprises an opening therethrough, and wherein the shaft extends through the central openings.

22. A dipper as claimed in claim 21, further comprising braking disks interleaved between the braking plates and the first ends of the braking arms.

23. A dipper as claimed in claim 22, wherein the braking disks are made from friction-generating material.

24. A dipper as claimed in claim 21, comprising several braking arms, each of the braking arms having a first end pivotally mounted to the shaft and a second end pivotally connected to the at least one linking member.

25. A dipper as claimed in claim 24, wherein each of the first ends of the braking arms is interleaved between two of the braking plates.

26. A dipper as claimed in claim 25, further comprising several braking disks interleaved between the braking plates and the first ends of the braking arms.

27. A dipper as claimed in claim 26, wherein the braking disks are made from friction-generating material.

28. A dipper as claimed in claim 21, further comprising first and second retaining plates mounted to the base, wherein the first retaining plate is located adjacent to the first piston and the second retaining plate is located adjacent to the second piston.

29. A dipper as claimed in claim 28, wherein the shaft is secured to the first and second retaining plates.

30. A dipper comprising a body, a door pivotally mounted to the body, and a mechanism for retarding a pivotal movement of the door with respect to the body, the mechanism comprising:
 a) a base configured to be secured to the body;
 b) at least one hydraulic piston mounted to the base, the at least one piston being fluidly connected to a hydraulic pressure source;
 c) a shaft mounted to the at least one piston;
 d) at least one braking plate mounted to the shaft;
 e) at least one braking arm having a first end and a second end, the first end of the braking arm being pivotally mounted to the shaft;
 f) at least one linking member having a first end and a second end, the first end of the linking member being pivotally connected to the second end of the at least one braking arm, and the second end of the linking member being configured to be pivotally connected to the door;
 whereby when hydraulic fluid is provided to the at least one piston, the at least one piston presses the at least one braking plate and the first end of the at least one braking arm against each other, effectively retarding a pivotal movement of the at least braking arm and effectively retarding a pivotal movement of the door with respect to the body.

* * * * *